US011955079B2

(12) United States Patent
Kwon et al.

(10) Patent No.: US 11,955,079 B2
(45) Date of Patent: Apr. 9, 2024

(54) PIXEL AND DISPLAY APPARATUS

(71) Applicant: Samsung Display Co., Ltd., Yongin-Si (KR)

(72) Inventors: Soongi Kwon, Yongin-si (KR); Jihyun Ka, Yongin-si (KR); Minjeong Kim, Yongin-si (KR); Minku Lee, Yongin-si (KR); Seunghee Lee, Yongin-si (KR); Hyeongjun Jin, Yongin-si (KR)

(73) Assignee: Samsung Display Co., Ltd., Yongin-Si (KR)

( * ) Notice: Subject to any disclaimer, the term of this patent is extended or adjusted under 35 U.S.C. 154(b) by 0 days.

(21) Appl. No.: 17/891,948

(22) Filed: Aug. 19, 2022

(65) Prior Publication Data

US 2023/0290305 A1 Sep. 14, 2023

(30) Foreign Application Priority Data

Jan. 24, 2022 (KR) ........................ 10-2022-0010229

(51) Int. Cl.
*G09G 3/3233* (2016.01)

(52) U.S. Cl.
CPC ..... *G09G 3/3233* (2013.01); *G09G 2300/043* (2013.01); *G09G 2300/0819* (2013.01); *G09G 2300/0842* (2013.01); *G09G 2300/0861* (2013.01); *G09G 2310/08* (2013.01); *G09G 2320/0233* (2013.01)

(58) Field of Classification Search
None
See application file for complete search history.

(56) References Cited

U.S. PATENT DOCUMENTS

| | | | | |
|---|---|---|---|---|
| 6,995,509 B2 | 2/2006 | Yamazki et al. | | |
| 8,405,583 B2 | 3/2013 | Ebisuno | | |
| 11,030,945 B2 | 6/2021 | Bae | | |
| 2012/0169693 A1* | 7/2012 | Tsai | G09G 3/3233 | 345/82 |
| 2012/0169798 A1* | 7/2012 | Ebisuno | G09G 3/325 | 345/77 |

(Continued)

FOREIGN PATENT DOCUMENTS

| | | |
|---|---|---|
| KR | 10-0570995 B1 | 4/2006 |
| KR | 10-1596978 B1 | 2/2016 |

(Continued)

*Primary Examiner* — Dorothy Harris
(74) *Attorney, Agent, or Firm* — Innovation Counsel LLP

(57) ABSTRACT

A pixel includes a display element, a driving transistor, a storage capacitor, a scan transistor, and a gate control circuit. The display element may emit light for an emission period, wherein the display element includes an anode and a cathode. The driving transistor may control an amount of a driving current flowing through the display element, wherein the driving transistor includes a first gate and a second gate. The storage capacitor is electrically connected to the first gate of the driving transistor. The scan transistor may be turned on for a data-write period for transferring a data voltage to the driving transistor. The lower gate control circuit may electrically connect the second gate of the driving transistor to the anode of the display element for the emission period, and may apply a bias voltage to the second gate of the driving transistor for the data-write period.

19 Claims, 15 Drawing Sheets

(56) References Cited

U.S. PATENT DOCUMENTS

| | | | | |
|---|---|---|---|---|
| 2013/0063413 | A1* | 3/2013 | Miyake | G09G 3/32<br>345/212 |
| 2015/0187276 | A1* | 7/2015 | Shim | G09G 3/3291<br>345/77 |
| 2016/0042694 | A1* | 2/2016 | Lim | G09G 3/3233<br>345/78 |
| 2018/0268760 | A1* | 9/2018 | Chen | G09G 3/3266 |
| 2021/0118365 | A1* | 4/2021 | Kim | H10K 59/124 |
| 2021/0210014 | A1 | 7/2021 | Kim et al. | |

FOREIGN PATENT DOCUMENTS

| | | | |
|---|---|---|---|
| KR | 10-2020-0115767 | A | 10/2020 |
| KR | 10-2020-0129242 | A | 11/2020 |
| KR | 10-2021-0087614 | A | 7/2021 |

* cited by examiner

PIXEL AND DISPLAY APPARATUS

CROSS-REFERENCE TO RELATED APPLICATION

This application claims priority under 35 U.S.C. § 119 to Korean Patent Application No. 10-2022-0010229 filed on Jan. 24, 2022 in the Korean Intellectual Property Office; the Korean Patent Application is incorporated by reference.

BACKGROUND

1. Field

The technical field is related to a pixel and a display apparatus.

2. Description of the Related Art

A display apparatus may display images in response to input signals or data. Display apparatuses, may be included in various electronic devices, such as mobile phones and televisions.

A display apparatus typically includes pixels that receive electrical signals and emit light to display images. Each pixel includes a display element. For example, an organic light-emitting display apparatus includes organic light-emitting diodes as display elements. Generally, an organic light-emitting display apparatus includes thin-film transistors and organic light-emitting diodes on a substrate.

SUMMARY

One or more embodiments may be related to a pixel and a display apparatus that may adjust a threshold voltage of a driving transistor.

According to one or more embodiments, a pixel includes a display element configured to emit light for an emission period, and including an anode and a cathode, a driving transistor configured to control an amount of a driving current flowing through the display element, wherein the driving transistor includes an upper gate and a lower gate, a storage capacitor connected to the upper gate of the driving transistor, a scan transistor configured to be turned on for a data-write period and to transfer a data voltage to the driving transistor, and a lower gate control circuit configured to connect the lower gate of the driving transistor to the anode of the display element for the emission period, and to apply a bias voltage to the lower gate of the driving transistor for the data-write period.

A voltage between the lower gate and a source of the driving transistor may be a first level for the data-write period, and may be a second level for the emission period, wherein the second level may be greater than the first level.

The bias voltage may be determined based on a minimum voltage within a data voltage range and a threshold voltage of the driving transistor.

The lower gate control circuit may include a first voltage control transistor configured to be turned on for the emission period to connect the lower gate of the driving transistor to the anode of the display element, and a second voltage control transistor configured to be turned on for the data-write period to transfer the bias voltage to the lower gate of the driving transistor.

The pixel may further include a first emission control transistor configured to be turned on for the emission period to transfer a driving voltage to a drain of the driving transistor, and a second emission control transistor configured to be turned on for the emission period to connect a source of the driving transistor to the anode of the display element.

A gate of the first voltage control transistor may be connected to gates of the first and second emission control transistors.

The pixel may further include a compensation transistor configured to be turned on for the data-write period to connect the upper gate to the drain of the driving transistor, a first initialization transistor configured to be turned on for a first initialization period to transfer a reference voltage to the upper gate of the driving transistor, and a second initialization transistor configured to be turned on for a second initialization period to transfer an initialization voltage to the anode of the display element, wherein the scan transistor may be configured to transfer the data voltage to the source of the driving transistor.

A gate of the second voltage control transistor may be connected to a gate of the second initialization transistor.

The second initialization period may include the first initialization period and the data-write period.

The driving transistor may be an n-type metal oxide semiconductor field-effect transistor.

The driving transistor may include a lower gate electrode, a semiconductor layer, and an upper gate electrode, wherein the lower gate electrode is the lower gate, the semiconductor layer is located on the lower gate electrode, and the upper gate electrode is located on the semiconductor layer and is the upper gate.

The semiconductor layer may include an oxide semiconductor material.

According to one or more embodiments, a pixel connected to first to third scan lines configured to respectively transfer first to third scan signals, an emission control line configured to transfer an emission control signal, a data line configured to transfer a data voltage, a power line configured to transfer a driving voltage, a first voltage line configured to transfer a reference voltage, a second voltage line configured to transfer an initialization voltage, and a third voltage line configured to transfer a bias voltage, includes a display element including an anode and a cathode, a storage capacitor including a first electrode and a second electrode, the second electrode being connected to the anode of the display element, a first transistor including an upper gate, a lower gate, a drain and a source, wherein the upper gate is connected to the first electrode of the storage capacitor, and the drain is connected to the power line, a second transistor configured to connect the data line to the source of the first transistor in response to the first scan signal, a third transistor configured to connect the upper gate to the drain of the first transistor in response to the first scan signal, a fourth transistor configured to connect the first voltage line to the upper gate of the first transistor in response to the second scan signal, a fifth transistor configured to connect the power line to the drain of the first transistor in response to the emission control signal, a sixth transistor configured to connect the anode of the display element to the source of the first transistor in response to the emission control signal, a seventh transistor configured to connect the second voltage line to the anode of the display element in response to the third scan signal, an eighth transistor configured to connect the lower gate of the first transistor to the anode of the display element in response to the emission control signal, and a ninth transistor configured to connect the third voltage line to the lower gate of the first transistor in response to the third scan signal.

The bias voltage may be determined based on a minimum voltage within a data voltage range and a threshold voltage of the first transistor.

The first transistor may include a lower gate electrode, a semiconductor layer, and an upper gate electrode, wherein the lower gate electrode is the lower gate, the semiconductor layer is located on the lower gate electrode and includes an oxide semiconductor material, and the upper gate electrode is located on the semiconductor layer and is the upper gate.

A voltage between the lower gate and the source of the first transistor may be a first level for a data-write period for which the second and third transistors are turned on by the first scan signal, and be a second level for an emission period for which the fifth and sixth transistors and the eighth transistor are turned on by the emission control signal.

The first level may be less than the second level.

The first to ninth transistors may be n-type metal oxide semiconductor field-effect transistors.

A gate of each of the second to ninth transistors may include an upper gate and a lower gate connected to each other.

According to one or more embodiments, a display apparatus includes a substrate extending in a first direction and a second direction, and a plurality of pixels arranged on the substrate in the first direction and the second direction, wherein each pixel includes the above-mentioned pixel.

An embodiment may be related to a pixel. The pixel may include a display element, a driving transistor, a storage capacitor, a scan transistor, and a gate control circuit. The display element may include an anode and a cathode and may emit light for an emission period. The driving transistor may include a first gate and a second gate and may control an amount of a driving current flowing through the display element. The storage capacitor may be electrically connected to the first gate of the driving transistor. The scan transistor may be turned on for a data-write period and may transfer a data voltage to the driving transistor. The gate control circuit may electrically connect the second gate of the driving transistor to the anode of the display element for the emission period, and may apply a bias voltage to the second gate of the driving transistor for the data-write period.

An embodiment may be related to a display apparatus. The display apparatus may include a substrate and pixels. The substrate may extend in a first direction and a second direction. The pixels may be arranged on the substrate in the first direction and the second direction and may include the pixel described above.

A voltage between the second gate and a source of the driving transistor may be at a first level for the data-write period, and may be at a second level for the emission period. The second level may be higher than the first level.

The bias voltage may be determined based on a minimum voltage within a data voltage range and a threshold voltage of the driving transistor.

The gate control circuit may include the following elements: a first voltage control transistor configured to be turned on for the emission period to electrically connect the second gate of the driving transistor to the anode of the display element; and a second voltage control transistor configured to be turned on for the data-write period to transfer the bias voltage to the second gate of the driving transistor.

The pixel may include the following elements: a first emission control transistor configured to be turned on for the emission period to transfer a driving voltage to a drain of the driving transistor; and a second emission control transistor configured to be turned on for the emission period to electrically connect a source of the driving transistor to the anode of the display element.

A gate of the first voltage control transistor may be electrically connected to both a gate of the first emission control transistor and a gate of the second emission control transistor.

The pixel may include the following elements: a compensation transistor configured to be turned on for the data-write period to connect the first gate of the driving transistor to the drain of the driving transistor; a first initialization transistor configured to be turned on for a first initialization period to transfer a reference voltage to the first gate of the driving transistor; and a second initialization transistor configured to be turned on for a second initialization period to transfer an initialization voltage to the anode of the display element. The scan transistor may transfer the data voltage to the source of the driving transistor.

A gate of the second voltage control transistor may be electrically connected to a gate of the second initialization transistor.

The second initialization period may include the first initialization period and the data-write period.

The driving transistor may be an n-type metal oxide semiconductor field-effect transistor.

The driving transistor may include a semiconductor layer positioned between the second gate and the first gate.

The semiconductor layer may include an oxide semiconductor material.

An embodiment may be related to a pixel electrically connected to each of a first scan line, a second scan line, a third scan line, an emission control line, a data line, a power line, a first voltage line, a second voltage line, and a third voltage line. The first scan line may transfer a first scan signal. The second scan line may transfer a second scan signal. The third scan line may transfer a third scan signal. The emission control line may transfer an emission control signal. The data line may transfer a data voltage.

The power line may transfer a driving voltage. The first voltage line may transfer a reference voltage. The second voltage line may transfer an initialization voltage. The third voltage line may transfer a bias voltage. The pixel may include the following elements: a display element including an anode and a cathode; a storage capacitor including a first electrode and a second electrode, the second electrode being electrically connected to the anode of the display element; a first transistor including a first gate, a second gate, a drain, and a source. The first gate may be electrically connected to the first electrode of the storage capacitor; a second transistor configured to connect the data line to the source of the first transistor in response to the first scan signal; a third transistor configured to connect the first gate of the first transistor to the drain of the first transistor in response to the first scan signal; a fourth transistor configured to connect the first voltage line to the first gate of the first transistor in response to the second scan signal; a fifth transistor configured to connect the power line to the drain of the first transistor in response to the emission control signal; a sixth transistor configured to connect the anode of the display element to the source of the first transistor in response to the emission control signal; a seventh transistor configured to connect the second voltage line to the anode of the display element in response to the third scan signal; an eighth transistor configured to connect the second gate of the first transistor to the anode of the display element in response to the emission control signal; and a ninth transistor configured to connect the third voltage line to the second gate of the first transistor in response to the third scan signal.

The bias voltage may be determined based on a minimum voltage within a data voltage range and a threshold voltage of the first transistor.

The first transistor may include a semiconductor layer located between the second gate and the first gate and including an oxide semiconductor material.

A voltage between the second gate of the first transistor and the source of the first transistor may be at a first level for a data-write period for which both the second transistor and the third transistor may be turned on by the first scan signal, and may be at a second level for an emission period for which all of the fifth transistor, the sixth transistor, and the eighth transistor may be turned on by the emission control signal.

The first level may be lower than the second level.

The first transistor, the second transistor, the third transistor, the fourth transistor, the fifth transistor, the sixth transistor, the seventh transistor, the eighth transistor, and the ninth transistor may all be n-type metal oxide semiconductor field-effect transistors.

Each of the second transistor, the third transistor, the fourth transistor, the fifth transistor, the sixth transistor, the seventh transistor, the eighth transistor, and the ninth transistor may include a first gate electrode and a second gate electrode electrically connected to each other.

DETAILED DESCRIPTION

Figure 1:
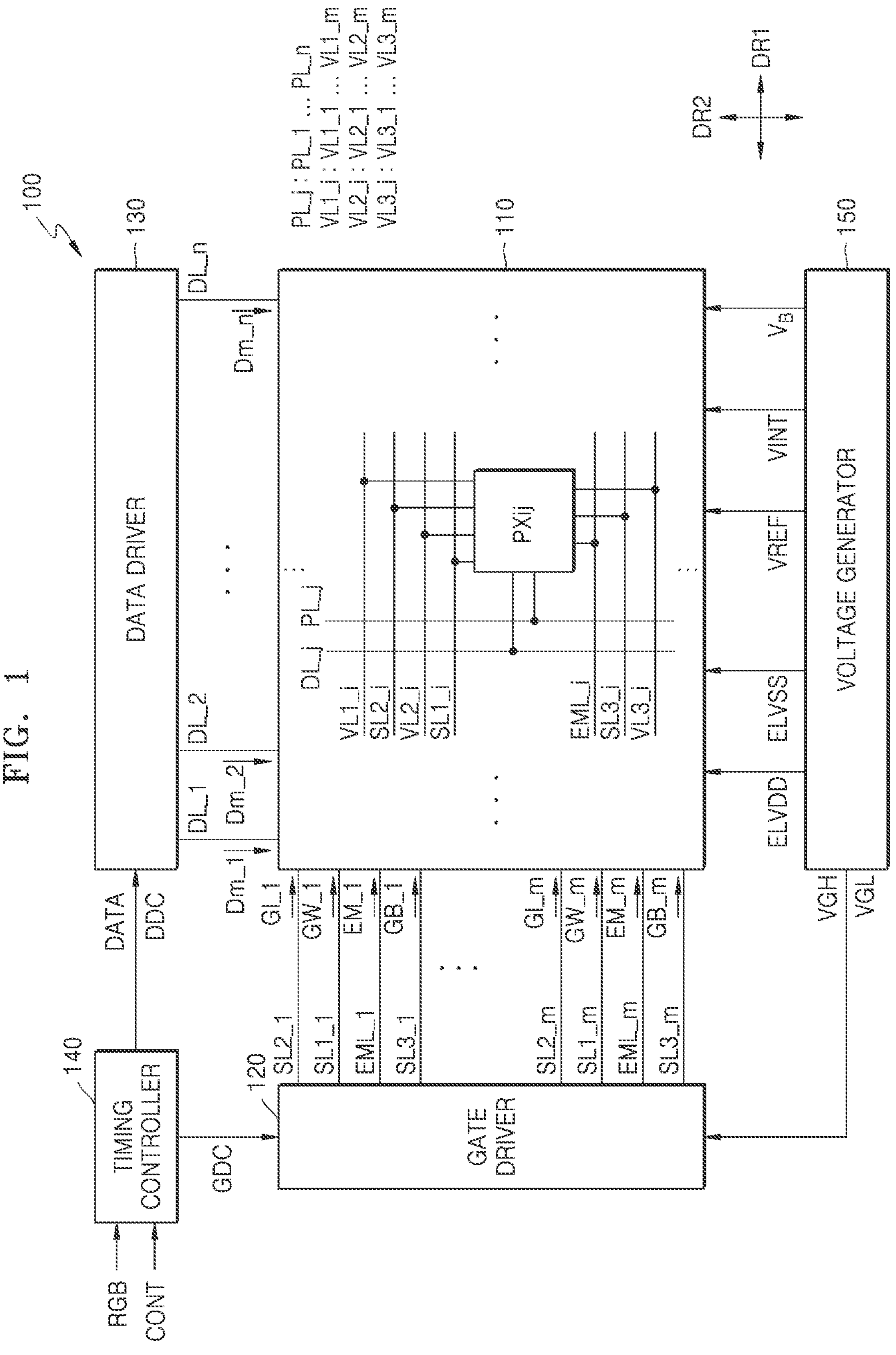
FIG. 1 is a schematic block diagram of a display apparatus according to an embodiment.

Examples of embodiments are described with reference to the accompanying drawings, wherein like reference numerals may refer to like elements. Practical embodiments may have different forms and should not be construed as being limited to the described embodiments.

Although the terms "first," "second," etc. may be used to describe various elements/features, the elements/features should not be limited to these terms. These terms may be used to distinguish one element/feature from another. A first element may be termed a second element without departing from teachings of one or more embodiments. The description of an element as a "first" element may not require or imply the presence of a second element or other elements. The terms "first," "second," etc. may be used to differentiate different categories or sets of elements. For conciseness, the terms "first," "second," etc. may represent "first-category (or first-set)," "second-category (or second-set)," etc., respectively.

The singular forms "a," "an," and "the" may indicate the plural forms as well unless the context clearly indicates otherwise.

The terms "comprise," "comprising," "include" and/or "including" may specify the presence of stated features or components but may not preclude the addition of one or more other features or components.

Dimensions of elements illustrated in the drawings may be exaggerated or reduced for convenience of explanation. Embodiments of the disclosure are not limited to the illustrated dimensions.

When a certain embodiment may be implemented differently, a specific process order may be performed in the order different from the described order. As an example, two processes that are successively described may be substantially simultaneously performed or performed in the order opposite to the order described.

The term "on" may mean "directly on" or "indirectly on." The term "connect" may mean "directly connect" or "indirectly connect." The term "connect" may mean "mechanically connect" and/or "electrically connect." The term "connected" may mean "electrically connected" or "electrically connected through no intervening transistor." The term "insulate" may mean "electrically insulate" or "electrically isolate." The term "conductive" may mean "electrically conductive." The term "drive" may mean "operate" or "control." The term "include" may mean "be made of." The term "adjacent" may mean "immediately adjacent." The term "contact" may mean "directly contact." The expression that an element extends in a particular direction may mean that the element extends lengthwise in the particular direction and/or that the lengthwise direction of the element is in the particular direction. The term "pattern" may mean "member." The term "defined" may mean "formed" or "provided." The expression that a space or opening overlaps an object may mean that (the position of) the space or opening overlaps with (the position of) the object. The term "overlap" may be equivalent to "be overlapped by." The expression that a first element overlaps with a second element in a plan view may mean that the first element overlaps the second element in direction perpendicular to a substrate.

FIG. 1 is a schematic block diagram of a display apparatus 100 according to an embodiment.

The display apparatus 100 may be an organic light-emitting display apparatus including a display element, for example, an organic light-emitting diode whose brightness changes according to a current. The display apparatus 100 may be an inorganic light-emitting display apparatus or a quantum-dot light-emitting display apparatus. An emission layer of a display element of the display apparatus 100 may include an organic material; an inorganic material; quantum dots; an organic material and quantum dots; an inorganic material and quantum dots; or an organic material, an inorganic material, and quantum dots.

Referring to FIG. 1, the organic light-emitting display apparatus 100 includes a display unit 110, a gate driver 120, a data driver 130, a timing controller 140, and a voltage generator 150.

The display unit 110 includes pixels such as a pixel PXij positioned in an i-th row and in a j-th column. Though only one pixel PXij is shown in FIG. 1 as an example, the display unit 110 may include m×n pixels arranged in a two-dimensional array. Here, i is a natural number equal to or less than m, and j is a natural number equal to or less than n.

The pixels are connected to first scan lines SL1_1 to SL1_m, second scan lines SL2_1 to SL2_m, emission control lines EML_1 to EML_m, third scan lines SL3_1 to SL3_m, and data lines DL_1, DL_2 to DL_n. The pixels are connected to power lines PL_1 to PL_n, first voltage lines VL1_1 to VL1_m, second voltage lines VL2_1 to VL2_m, and third voltage lines VL3_1 to VL3_m. As an example, the pixel PXij may be connected to a first scan line SL1_i, a second scan line SL2_i, an emission control line EML_i, a third scan line SL3_i, a data line DL_j, a power line PL_j, a first voltage line VL1_i, a second voltage line VL2_i, and a third voltage line VL3_i.

The first scan lines SL1_1 to SL1_m, the second scan lines SL2_1 to SL2_m, the emission control lines EML_1 to EML_m, the third scan lines SL3_1 to SL3_m, the first voltage lines VL1_1 to VL1_m, the second voltage lines VL2_1 to VL2_m, and the third voltage lines VL3_1 to VL3_m may each extend in a first direction DR1 (e.g., a row direction) and may each be connected to pixels in the same row. The data lines DL_1 to DL_n and the power lines PL_1 to PL_n may each extend in a second direction DR2 (e.g., a column direction) and may each be connected to pixels PX in the same column.

The first scan lines SL1_1 to SL1_m are configured to respectively transfer first scan signals GW_1 to GW_m output from the gate driver 120 to pixels in different rows, the second scan lines SL2_1 to SL2_m are configured to respectively transfer second scan signals GI_1 to GI_m output from the gate driver 120 to pixels in different rows, and the third scan lines SL3_1 to SL3_m are configured to respectively transfer third scan signals GB_1 to GB_m output from the gate driver 120 to pixels in different rows.

The emission control lines EML_1 to EML_m are configured to respectively transfer emission control signals EM_1 to EM_m output from the gate driver 120 to pixels in different rows. The data lines DL_1 to DL_n are configured to respectively transfer data voltages Dm_1 to Dm_n output from the data driver 130 to pixels in different columns. The pixel PXij receives scan signals GW_i, GI_i, and GB_i, a data voltage Dm_j, and an emission control signal EM_i (shown in FIG. 2).

Each of the power lines PL_1 to PL_n is configured to transfer a first driving voltage ELVDD output from the voltage generator 150 to pixels in the same column. Each of the first voltage lines VL1_1 to VL1_m is configured to transfer a reference voltage VREF output from the voltage generator 150 to pixels in same row. Each of the second voltage lines VL2_1 to VL2_m is configured to transfer an initialization voltage VINT output from the voltage generator 150 to pixels in the same row. Each of the third voltage lines VL3_1 to VL3_m is configured to transfer a bias voltage $V_B$ output from the voltage generator 150 to pixels in the same row.

The pixel PXij includes a display element and the driving transistor configured to control the amount of a current flowing through the display element based on a data voltage Dm_j. The data voltage Dm_j is output from the data driver 130 and received by the pixel PXij through a data line DL_j. The display element may be, for example, an organic light-emitting diode. Because the display element emits light at a brightness corresponding to the amount of a current received from the driving transistor, the pixel PXij may express a grayscale corresponding to the data voltage Dm_j. A pixel may correspond to a portion (for example, a sub-pixel) of a unit pixel that may express full colors. The pixel PXij may further include at least one switching transistor and at least one capacitor.

The voltage generator 150 may generate voltages required for driving the pixel Pxij. The voltage generator 150 may generate the first driving voltage ELVDD, the second driving voltage ELVSS, the reference voltage VREF, the initialization voltage VINT, and the bias voltage $V_B$. A level of the first driving voltage ELVDD may be greater than a level of the second driving voltage ELVSS. The reference voltage VREF may be greater than the initialization voltage VINT. The initialization voltage VINT may be greater than the second driving voltage ELVSS. A difference between the initialization voltage VINT and the second driving voltage ELVSS may be less than a threshold voltage required for the display element of the pixel to emit light. A level of the reference voltage VREF may be different from a level of the first driving voltage ELVDD. The reference voltage VREF may be less than the first driving voltage ELVDD. The reference voltage VREF may be equal to the first driving voltage ELVDD.

The voltage generator 150 may generate a first gate voltage VGH and a second gate voltage VGL for controlling the switching transistor of the pixel PXij, and may provide the gate voltages VGH and VGL to the gate driver 120. When the first gate voltage VGH is applied to a gate of the switching transistor, the switching transistor is turned on, and when the second gate voltage VGL is applied to the gate of the switching transistor, the switching transistor may be turned off. The first gate voltage VGH may be a gate-on voltage, and the second gate voltage VGL may be a gate-off voltage. Switching transistors of the pixel PXij may be n-type metal oxide semiconductor field-effect transistors (MOSFET), and a level of the first gate voltage VGH may be higher than a level of the second gate voltage VGL. Although not shown in FIG. 1, the voltage generator 150 may generate reference voltages and may provide the reference voltages to the data driver 130.

The timing controller 140 may control the display unit 110 by controlling operation timing of the gate driver 120 and the data driver 130. The pixels of the display unit 110 may display images corresponding to image source data RGB of one frame by receiving new data voltages Dm_1, Dm_2 to Dm_n and emitting light at brightness levels corresponding to the data voltages Dm_1, Dm_2 to Dm_n for every frame period. One frame period may include a gate initialization period, a data-write period, an anode initialization period, and an emission period. For the gate initialization period, the reference voltage VREF may be applied to the pixels in synchronization with the second scan signals GI_1 to GI_m. For the data-write period, the data voltages Dm_1 to Dm_n may be provided to the pixels in synchronization with the first scan signals GW_1 to GW_m. For the anode initialization period, the initialization voltage VINT may be applied to the pixels in synchronization with the third scan signals GB_1 to GB_m. For the emission period, the pixels of the display unit 110 emit light.

The timing controller 140 receives image source data RGB and a control signal CONT from an external device. The timing controller 140 may convert the image source data RGB into image data DATA based on the characteristics of the display unit 110 and the pixels PX. The timing controller 140 may provide the image data DATA to the data driver 130.

Control signals CONT may include a vertical synchronization signal (Vsync), a horizontal synchronization signal (Hsync), a data enable signal (DE), and a clock signal (CLK). The timing controller 140 may control an operation timing of the gate driver 120 and the data driver 130 using control signals CONT. The timing controller 140 may determine a frame period by counting a data enable signal DE of a horizontal scanning period. The vertical synchronization signal Vsync and the horizontal synchronization signal Hsync supplied from the outside may be optional. The image source data RGB includes luminance information of the pixels. The luminance may have a predetermined number, for example, 1024 ($=2^{10}$), 256 ($=2^8$), or 64 ($=2^6$), of grayscales.

The timing controller 140 may generate control signals including a gate timing control signal GDC for controlling an operation timing of the gate driver 120, and including a data timing control signal DDC for controlling an operation timing of the data driver 130.

Gate timing control signals GDC may include a gate start pulse (GSP), a gate shift clock (GSC), and a gate output enable signal (GOE). The gate start pulse (GSP) is supplied to the gate driver 120 at a start point of a scan period. The gate shift clock (GSC) is a clock signal input in common to the gate driver 120 and is a clock signal for shifting a gate start pulse (GSP). The gate output enable signal (GOE) is configured to control an output of the gate driver 120.

The data timing control signal DDC may include a source start pulse (SSP), a source sampling clock (SSC), and a source output enable signal (SOE). The source start pulse (SSP) is configured to control a data sampling start point of the data driver 130 and is provided to the data driver 130 at a start point of a scan period. The source sampling clock (SSC) is a clock signal configured to control a data sampling operation within the data driver 130 based on a rising or falling edge. The output enable signal (SOE) is configured to control an output of the data driver 130. The source start pulse (SSP) supplied to the data driver 130 may be optional depending on a data transmission method.

The gate driver 120 is configured to sequentially generate first scan signals GW_1 to GW_m, second scan signals GI_1 to GI_m, third scan signals GB_1 to GB_m in response to a gate timing control signal GDC supplied from the timing controller 140 using the first and second gate voltages VGH and VGL provided from the voltage generator 150.

The data driver 130 samples and latches image data DATA supplied from the timing controller 140 in response to a data timing control signal DDC, and converts the image data DATA to data of a parallel data system, wherein the data timing control signal DDC is supplied from the timing controller 140. When converting the image data DATA into the data of the parallel data system, the data driver 130 converts the image data DATA into a gamma reference voltage, thereby converting the image data DATA into a data voltage of an analog form. The data driver 130 provides data voltages Dm_1, Dm_2 to Dm_n to the pixels through data lines DL_1, DL_2 to DL_n. The pixels receive the data voltages Dm_1 to Dm_n in response to the first scan signals GW_1 to GW_m.

Figure 2:
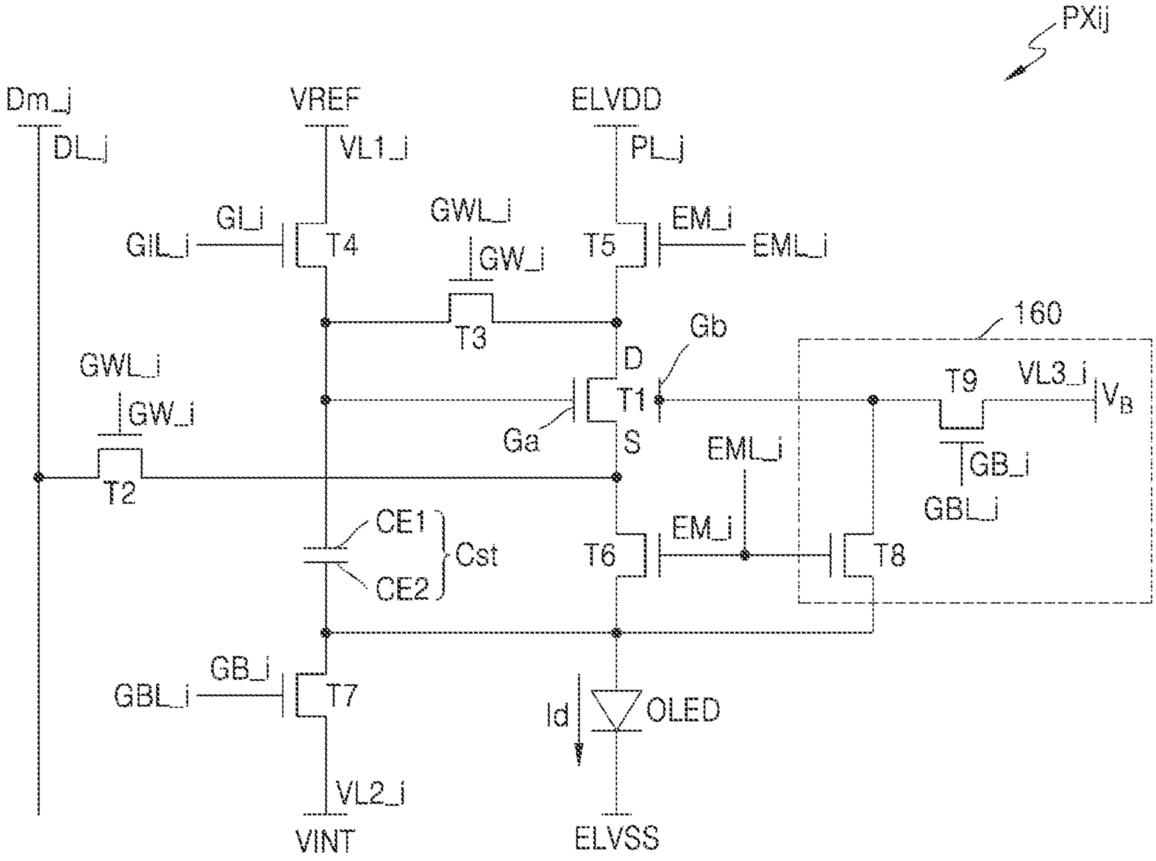
FIG. 2 is an equivalent circuit diagram of a pixel according to an embodiment.

FIG. 2 is an equivalent circuit diagram of a pixel according to an embodiment.

Referring to FIG. 2, the pixel PXij is connected to first to third scan lines GWL_i, GIL_i, and GBL_i configured to respectively transfer first to third scan signals GW_i, GI_i, and GB_i, is connected to a data line DL_j configured to transfer a data voltage Dm_j, and is connected to an emission control line EML_i configured to transfer an emission control signal EM_i. The pixel PXij is connected to a power line PL_j configured to transfer the first driving voltage ELVDD, is connected to a first voltage line VL1_i configured to transfer the reference voltage VREF, is connected to a second voltage line VL2_i configured to transfer the initialization voltage VINT, and is connected to a third voltage line VL3_i configured to transfer a bias voltage $V_B$. The pixel PXij includes a portion of a common electrode to which the second driving voltage ELVSS is applied. The pixel PXij corresponds to the pixel PXij illustrates in FIG. 1.

The first scan line GWL_i corresponds to the first scan line SL1_i of FIG. 1, the second scan line GIL_i corresponds to the second scan line SL2_i of FIG. 1, and the third scan line GBL_i corresponds to the third scan line SL3_i of FIG. 1.

The pixel PXij includes a display element OLED; first to seventh transistors T1, T2, T3, T4, T5, T6, and T7; a storage capacitor Cst; and a lower gate control circuit 160.

The display element OLED may be an organic light-emitting diode including an anode and a cathode. The cathode may be the portion of the common electrode (to which the second driving voltage ELVSS is applied).

The first transistor T1 may be a driving transistor in which the amount of a drain current is determined according to a gate-source voltage. The second to seventh transistors T2, T3, T4, T5, T6, and T7 may be switching transistors that are turned on/off according to a gate-source voltage, substantially a gate voltage. The first to seventh transistors T1, T2, T3, T4, T5, T6, and T7 may each include a thin-film transistor. The first to seventh transistors T1, T2, T3, T4, T5, T6, and T7 may each include an n-channel MOSFET.

The first transistor T1 may be a driving transistor, the second transistor T2 may be a scan transistor, the third transistor T3 may be a compensation transistor, the fourth transistor T4 may be a gate initialization transistor (or a first initialization transistor), the fifth transistor T5 may be a first emission control transistor, the sixth transistor T6 may be a second emission control transistor, and the seventh transistor T7 may be an anode initialization transistor (or a second initialization transistor).

The storage capacitor Cst is connected between an upper gate Ga of the driving transistor T1 and the anode of the display element OLED. The storage capacitor Cst may include a first electrode CE1 and a second electrode CE2, wherein the first electrode CE1 is connected to the upper gate Ga of the driving transistor T1, and the second electrode CE2 is connected to the anode of the display element OLED.

The driving transistor T1 may control the amount of a driving current Id flowing through the display element OLED. The display element OLED may receive the driving current Id from the driving transistor T1 and may emit light at brightness corresponding to the amount of the driving current Id. The driving transistor T1 may include the upper gate Ga, a drain, a source, and a lower gate Gb, wherein the upper gate Ga is connected to the first electrode CE1 of the storage capacitor Cst, the drain is connected to the power line PL_j through the first emission control transistor T5, the source is connected to the display element OLED through the second emission control transistor T6, and the lower gate Gb is connected to the lower gate control circuit 160.

The scan transistor T2 may connect the data line DL_j to the driving transistor T1 in response to the first scan signal GW_i. The scan transistor T2 may transfer the data voltage Dm_j to the driving transistor T1 in response to the first scan signal GW_i. The scan transistor T2 may connect the data line DL_j to the source of the driving transistor T1 in response to the first scan signal GW_i. The scan transistor T2 may transfer the data voltage Dm_j to the source of the driving transistor T1 in response to the first scan signal GW_i.

The compensation transistor T3 may connect the drain to the upper gate Ga of the driving transistor T1 in response to the first scan signal GW_i. The compensation transistor T3 may be connected in series with the drain and the upper gate Ga of the driving transistor T1 and connected between the drain and the upper gate Ga of the driving transistor T1.

The gate initialization transistor T4 may connect the first voltage line VL1_i to the upper gate Ga of the driving transistor T1 in response to the second scan signal GI_i. The gate initialization transistor T4 may apply the reference voltage VREF to the upper gate Ga of the driving transistor T1 in response to the second scan signal GI_i. The gate initialization transistor T4 may connect the first voltage line VL1_i to the first electrode CE1 of the storage capacitor Cst in response to the second scan signal GI_i. The gate initialization transistor T4 may apply the reference voltage VREF to the first electrode CE1 of the storage capacitor Cst in response to the second scan signal GI_i.

The first emission control transistor T5 may connect the power line PL_j to the drain of the driving transistor T1 in response to the emission control signal EM_i. The first emission control transistor T5 may connect the power line PL_j to the drain of the driving transistor T1 in response to the emission control signal EM_i.

The second emission control transistor T6 may connect the source of the driving transistor T1 to the anode of the display element OLED in response to the emission control signal EM_i. The second emission control transistor T6 may connect the source of the driving transistor T1 to the anode of the display element OLED in response to the emission control signal EM_i.

The anode initialization transistor T7 may connect the second voltage line VL2_i to the anode of the display element OLED in response to the third scan signal GB_i. The anode initialization transistor T7 may apply the initialization voltage VINT to the anode of the display element OLED in response to the third scan signal GB_i. The anode initialization transistor T7 may connect the second voltage line VL2_i to the second electrode CE2 of the storage capacitor Cst in response to the third scan signal GB_i. The anode initialization transistor T7 may apply the initialization voltage VINT to the second electrode CE2 of the storage capacitor Cst in response to the third scan signal GB_i.

The lower gate control circuit 160 may apply the bias voltage $V_B$ to the lower gate Gb of the driving transistor T1 for a data-write period, and may connect the lower gate Gb of the driving transistor T1 to the anode of the display element OLED for the emission period. Because an anode voltage of the display element OLED may be substantially equal to a source voltage of the driving transistor T1, the lower gate control circuit 160 may connect the lower gate Gb of the driving transistor T1 to the source of the driving transistor T1 for substantially the whole emission period.

The lower gate control circuit 160 may include the eighth and ninth transistors T8 and T9. The eighth and ninth transistors T8 and T9 may each be the switching transistor turned on/off according to a gate-source voltage, substantially a gate voltage. The eighth and ninth transistors T8 and T9 may each include a thin-film transistor. The eighth and ninth transistors T8 and T9 may each include an n-channel MOSFET.

The eighth transistor T8 may be a first voltage control transistor, and the ninth transistor T9 may be a second voltage control transistor.

The first voltage control transistor T8 may connect the lower gate Gb of the driving transistor T1 to the anode of the display element OLED in response to the emission control signal EM_i. The first voltage control transistor T8 may connect the lower gate Gb of the driving transistor T1 to the anode of the display element OLED in response to the emission control signal EM_i. A gate of the first voltage control transistor T8 may be connected to gates of the first and second emission control transistors T5 and T6.

The second voltage control transistor T9 may connect the third voltage line VL3_i to the lower gate Gb of the driving transistor T1 in response to the third scan signal GB_i. The second voltage control transistor T9 may apply the bias voltage line $V_B$ to the lower gate Gb of the driving transistor T1 in response to the third scan signal GB_i. A gate of the second voltage control transistor T9 may be connected to a gate of the anode initialization transistor T7.

Figure 3:
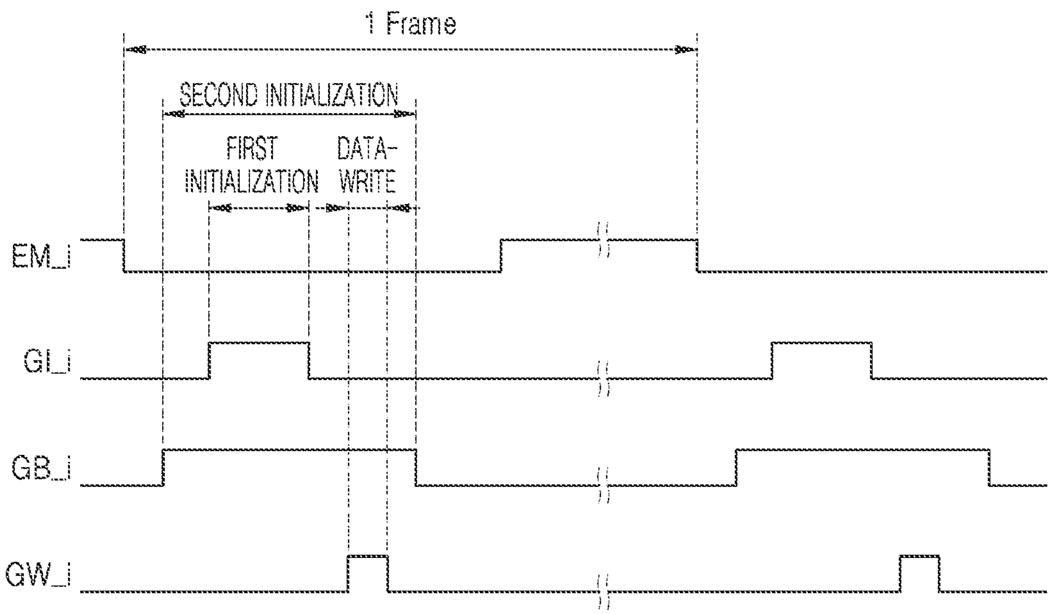
FIG. 3 is a timing diagram of control signals for operating the pixel circuit shown in FIG. 2 according to an embodiment.

FIG. 3 is a timing diagram of control signals for operating the pixel circuit shown in FIG. 2 according to an embodiment.

Referring to FIGS. 2 and 3, the first and second emission control transistors T5 and T6 are turned off for a period in which the emission control signal EM_i has a low level. The period in which the emission control signal EM_i has a low level may be a non-emission period.

For the non-emission period, the driving transistor T1 stops outputting the driving current Id, and the display element OLED stops emitting light.

The second scan signal GI_i has a high level when the first scan signal GW_i has a low level. The period in which the second scan signal GI_i has a pulse voltage of a high level may be the first initialization period (or a gate initialization period).

For the first initialization period, the gate initialization transistor T4 is turned on, and the reference voltage VREF is applied to the upper gate Ga of the driving transistor T1 and the first electrode CE1 of the storage capacitor Cst.

The second scan signal GI_i transitions to a low level again; subsequently, the first scan signal GW_i has a high level. The period in which the first scan signal GW_i has a pulse voltage of a high level may be a data-write period.

For the data-write period, the scan transistor T2 and the compensation transistor T3 are turned on, and the data voltage Dm_j is received by the source of the driving transistor T1. The driving transistor T1 is diode-connected by the compensation transistor T3.

When the second scan signal GI_i has a high level and the first scan signal GW_i has a high level, the third scan signal GB_i may have a high level. The period in which the third scan signal GB_i has a pulse voltage of a high level may be the second initialization period (or an anode initialization period).

For the second initialization period, the anode initialization transistor T7 is turned on, and the initialization voltage VINT is applied to the anode of the display element OLED. Because the initialization voltage VINT is applied to the anode of the display element OLED such that the display element OLED does not emit light completely, the display element OLED may not emit conspicuous unwanted light in response to a black grayscale in a next frame.

For the second initialization period, the second voltage control transistor T9 is turned on, and the bias voltage $V_B$ is applied to the lower gate Gb of the driving transistor T1.

Subsequently, the first scan signal GW_i and the third scan signal GB_i transition to a low level, and the emission control signal EM_i has a high level. The period in which the emission control signal EM_i has a high level may be an emission period.

For the emission period, the first and second emission control transistors T5 and T6 are turned on. The driving transistor T1 may output the driving current Id, and the display element OLED may emit light at a brightness corresponding to the amount of the driving current Id.

For the emission period, the first voltage control transistor T8 is turned on, and the lower gate Gb of the driving transistor T1 is connected to the anode of the display element OLED.

The second scan signal GI_i may be substantially synchronized with a first scan signal GW_i-1 in a previous row.

As shown in FIG. 3, the second initialization period may include the first initialization period and the data-write period. The second initialization period may overlap with both the first initialization period and the data-write period.

Because the second initialization period includes the data-write period, the bias voltage $V_B$ is applied to the lower gate Gb of the driving transistor T1 for the data-write period. Because the bias voltage $V_B$ is applied to the lower gate Gb of the driving transistor T1 for the data-write period, a threshold voltage Vth of the driving transistor T1 may be adjusted by adjusting a voltage level between the lower gate Gb and the source of the driving transistor T1. The threshold voltage Vth of the driving transistor T1 may be increased by applying the bias voltage $V_B$ less than the source voltage of the driving transistor T1 to the lower gate Gb of the driving transistor T1 for the data-write period. A leakage current occurring for the data-write period may be reduced by allowing the driving transistor T1 to have a threshold voltage Vth greater than 0.

The bias voltage $V_B$ may be determined based on a minimum voltage within a data voltage range and the threshold voltage Vth of the driving transistor T1. As an example, when the brightness of the pixel PXij has 256 ($=2^8$) grayscales, the data voltage range is determined by a data voltage corresponding to a 0-grayscale (a black grayscale) and a data voltage corresponding to a 255-grayscale (a white grayscale). The minimum voltage within the data voltage range may be a data voltage corresponding to the 0-grayscale. The bias voltage $V_B$ may be less than the minimum voltage within the data voltage range, and may be determined by a preset level such that the driving transistor T1 has a preset threshold voltage (Vth).

Because the second initialization period includes the data-write period, a difference (Dm_j+Vth−VINT) between a data compensation voltage (Dm_j+Vth) and the initialization voltage VINT may be stored in the storage capacitor Cst for the data-write period.

A voltage between the lower gate Gb and the source of the driving transistor T1 may have a first level for the data-write period, and may have a second level for the emission period.

For the data-write period, the bias voltage $V_B$ is applied to the lower gate Gb of the driving transistor T1 by the lower gate control circuit 160, and the data voltage Dm_j is applied to the source of the driving transistor T1 by the scan transistor T2; therefore, the first level may be a difference ($V_B$-Dm_j) between the bias voltage $V_B$ and the data voltage Dm_j. For the emission period, the lower gate Gb of the driving transistor T1 is connected to the anode of the display element OLED by the lower gate control circuit 160, and the anode voltage of the display element OLED is substantially equal to the source voltage of the driving transistor T1; therefore, the second level may be substantially 0.

The first level may be lower than the second level. The bias voltage $V_B$ may be less than 0. The bias voltage $V_B$ may be about −1 V. The data voltage Dm_j may be in a range of about −0.5 V to about 1.5 V. Because the first level is a difference ($V_B$-Dm_j) between the bias voltage $V_B$ and the data voltage Dm_j, the first level may be in a range of about −2.5 V to about −0.5 V. Because the second level is substantially 0, the first level may be lower than the second level.

For the emission period, a voltage between the lower gate Gb and the source of the driving transistor T1 of each pixel arranged in the display apparatus is substantially 0. Levels of the second driving voltages ELVSS may be different depending on positions of the pixels. For the emission period, a voltage between the lower gate Gb and the source of the driving transistor T1 of each pixel arranged in the display apparatus is substantially 0; therefore, a difference in the brightness between pixels may be prevented from occurring due to a difference in the levels of the second driving voltages ELVSS.

Figure 4:
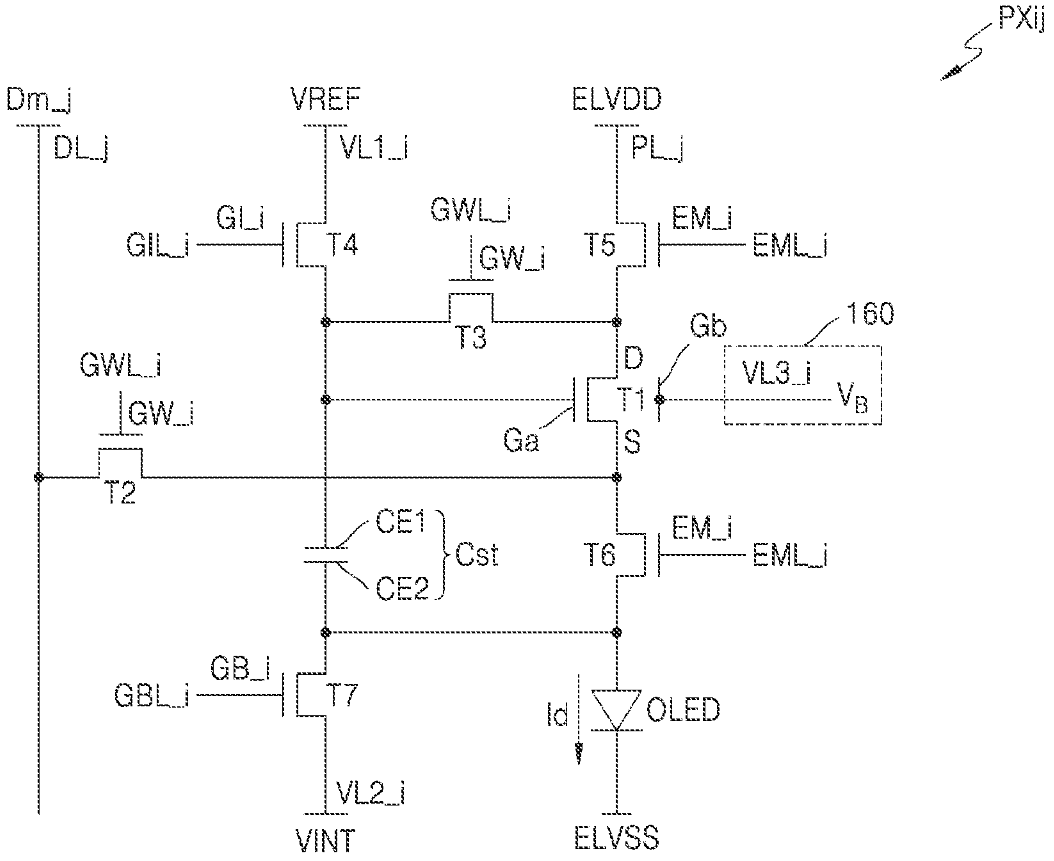
FIG. 4 is a view for explaining operation of a lower gate control circuit for a data-write period according to an embodiment.

FIG. 4 is a view for explaining an operation of a lower gate control circuit for a data-write period according to an embodiment.

Referring to FIG. 4, the lower gate control circuit 160 may apply the bias voltage $V_B$ to the lower gate Gb of the driving transistor T1 for the data-write period.

The threshold voltage Vth of the driving transistor T1 may be adjusted by adjusting the voltage level between the lower gate Gb and the source of the driving transistor T1. The threshold voltage (Vth) of the driving transistor T1 may be increased by applying the bias voltage $V_B$ less than the source voltage of the driving transistor T1 to the lower gate Gb of the driving transistor T1 for the data-write period. A leakage current occurring for the data-write period may be reduced by allowing the driving transistor T1 to have a threshold voltage Vth greater than 0.

Figure 5:
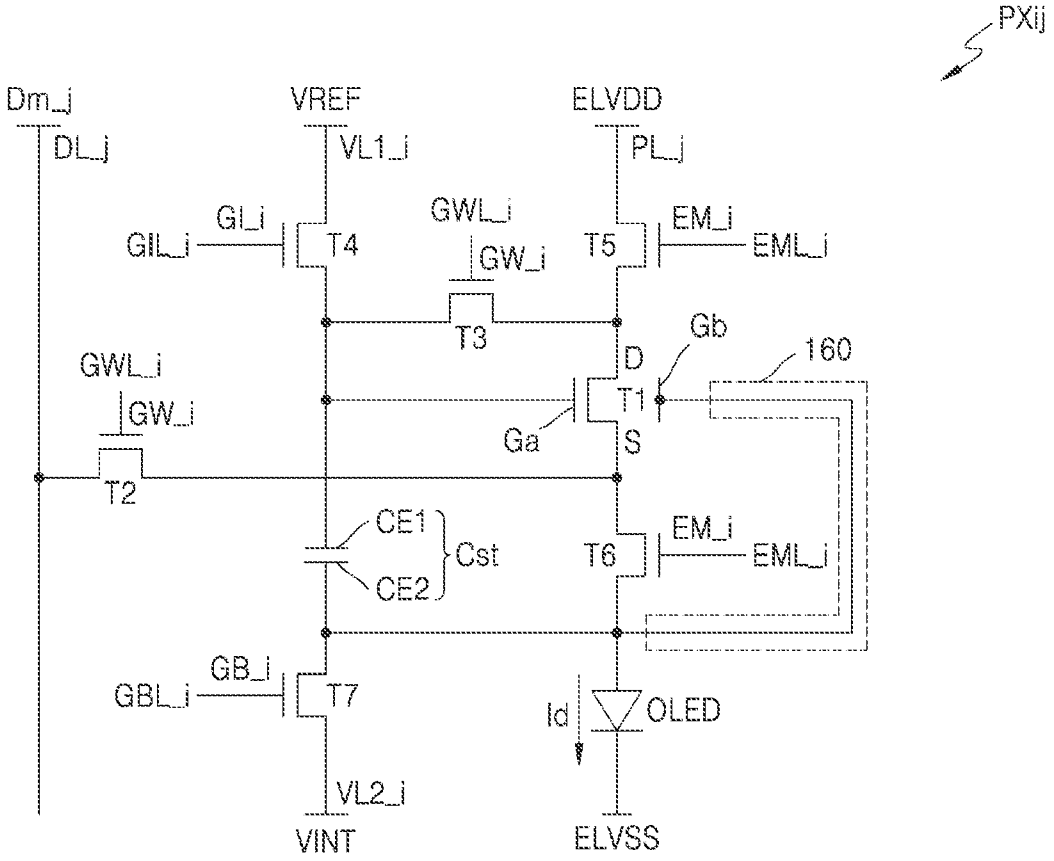
FIG. 5 is a view for explaining operation of a lower gate control circuit for an emission period according to an embodiment.

FIG. 5 is a view for explaining an operation of a lower gate control circuit for an emission period according to an embodiment.

Referring to FIG. 5, the lower gate control circuit 160 may connect the lower gate Gb of the driving transistor T1 to the anode of the display element OLED for the emission period. Because an anode voltage of the display element OLED may be substantially equal to a source voltage of the driving transistor T1, the lower gate control circuit 160 may connect the lower gate Gb of the driving transistor T1 to the source of the driving transistor T1 for substantially the whole emission period.

For the emission period, a voltage between the lower gate Gb and the source of the driving transistor T1 of each pixel arranged in the display apparatus is substantially 0. Levels of the second driving voltages ELVSS may be different from each other depending on positions of the pixels. For the emission period, a voltage between the lower gate Gb and the source of the driving transistor T1 of each pixel arranged in the display apparatus is substantially 0, a difference in the brightness between pixels may be prevented from occurring due to a difference in the levels of the second driving voltages ELVSS.

Figure 6:
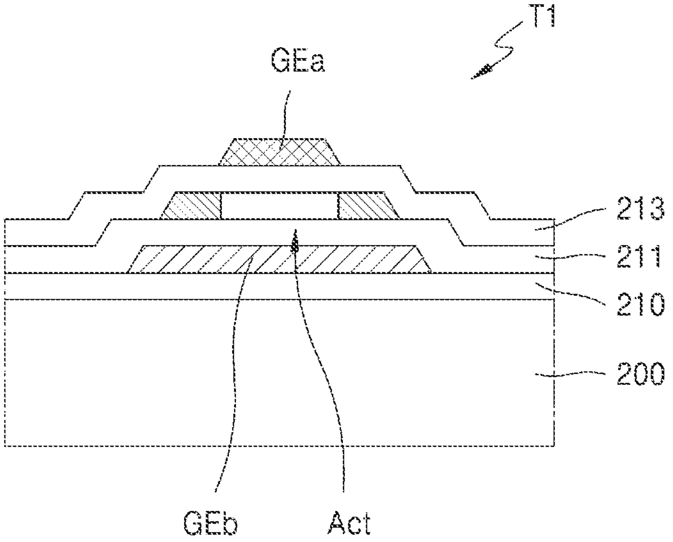
FIG. 6 is a schematic cross-sectional view of a driving transistor according to an embodiment.

FIG. 6 is a schematic cross-sectional view of a driving transistor according to an embodiment.

Referring to FIG. 6, the driving transistor T1 may include a lower gate electrode GEb, a semiconductor layer Act, and an upper gate electrode GEa. The lower gate electrode GEb serves as the lower gate Gb of the driving transistor T1 shown in FIG. 2, and the upper gate electrode GEa serves as the upper gate Ga of the driving transistor T1 shown in FIG. 2.

A substrate 200 may include a glass material, a ceramic material, metal, and/or a flexible and/or bendable material. When the substrate 200 is flexible or bendable, the substrate 200 may include at least one of a polymer resin including polyethersulfone, polyacrylate, polyetherimide, polyethylene naphthalate, polyethylene terephthalate, polyphenylene sulfide, polyarylate, polyimide, polycarbonate, and cellulose acetate propionate.

The substrate 200 may have a single-layered structure or a multi-layered structure, and may include an inorganic layer. The substrate 200 may include a first organic material, an intervening inorganic material, and a second organic material.

A buffer layer 211 may reduce or block foreign materials, moisture, or external air penetrating the substrate 200 from damaging the semiconductor layer Act. The buffer layer 211 may include an inorganic material, an organic material, or an organic/inorganic composite material, and may include a single layer or a multi-layer structure. The inorganic material may include an oxide or nitride.

A barrier layer 210 may be disposed between the substrate 200 and the buffer layer 211. The barrier layer 210 may block impurities from damaging the semiconductor layer Act. The barrier layer 210 may include an inorganic material, an organic material, or an organic/inorganic composite material, and may include a single layer or a multi-layer structure. The inorganic material may include an oxide or nitride.

The semiconductor layer Act may be disposed on the buffer layer 211. The semiconductor layer Act may include a single layer or a multi-layer structure. The semiconductor layer Act may include a semiconductor region and conductive regions respectively disposed on two opposite sides of the semiconductor layer.

The semiconductor layer Act may include an oxide semiconductor material. The semiconductor layer Act may include an oxide of at least one of indium (In), gallium (Ga), stannum (Sn), zirconium (Zr), vanadium (V), hafnium (Hf), cadmium (Cd), germanium (Ge), chromium (Cr), titanium (Ti), aluminum (Al), cesium (Cs), cerium (Ce), and zinc (Zn).

The semiconductor layer Act may be an ITZO(InSnZnO) semiconductor layer or an IGZO(InGaZnO) semiconductor layer. Because an oxide semiconductor has a wide band gap (of about 3.1 eV), high carrier mobility, and a low leakage current, a voltage drop is not large even though a driving time is long. Advantageously, a brightness change due to a voltage drop is not conspicuous even when the display apparatus is driven at low frequencies.

The semiconductor layer Act may include amorphous silicon or polycrystalline silicon.

The lower gate electrode GEb may be disposed between the substrate 200 and the buffer layer 211. The lower gate electrode GEb may overlap at least a portion of the semiconductor layer Act. The lower gate electrode GEb may include a conductive material including at least one molybdenum (Mo), aluminum (Al), copper (Cu), and titanium (Ti) and have a single-layered structure or a multi-layered structure.

The lower gate electrode GEb may be connected to the lower gate control circuit 160 shown in FIG. 2. The bias voltage $V_B$ may be applied to the lower gate electrode GEb for the data-write period, and the lower gate electrode GEb may be connected to the anode of the display element OLED for the emission period.

A gate insulating layer 213 may be provided on the buffer layer 211 to cover the semiconductor layer Act. The gate insulating layer 213 may include silicon oxide ($SiO_2$), silicon nitride ($SiN_x$), silicon oxynitride (SiON), aluminum oxide ($Al_2O_3$), titanium oxide ($TiO_2$), tantalum oxide ($Ta_2O_5$), hafnium oxide ($HfO_2$), or zinc oxide ($ZnO_x$). Zinc oxide ($ZnO_x$) may be zinc oxide (ZnO) and/or zinc peroxide ($ZnO_2$).

FIG. 6 shows that the gate insulating layer 213 is disposed over an entire surface of the substrate 200 to cover the semiconductor layer Act. The gate insulating layer 213 may be patterned to overlap a portion of the semiconductor layer Act and to expose other portions of the semiconductor layer Act. The gate insulating layer 213 may be patterned to overlap the semiconductor region of the semiconductor layer Act and to expose other regions of the semiconductor layer Act.

The upper gate electrode GEa may be disposed on the gate insulating layer 213. The upper gate electrode GEa may overlap at least a portion of the semiconductor layer Act. The upper gate electrode GEa may overlap the semiconductor region of the semiconductor layer Act. The upper gate electrode GEa may include a conductive material including at least one of molybdenum (Mo), aluminum (Al), copper (Cu), and titanium (Ti) and may have a single-layered structure or a multi-layered structure.

Figure 7:
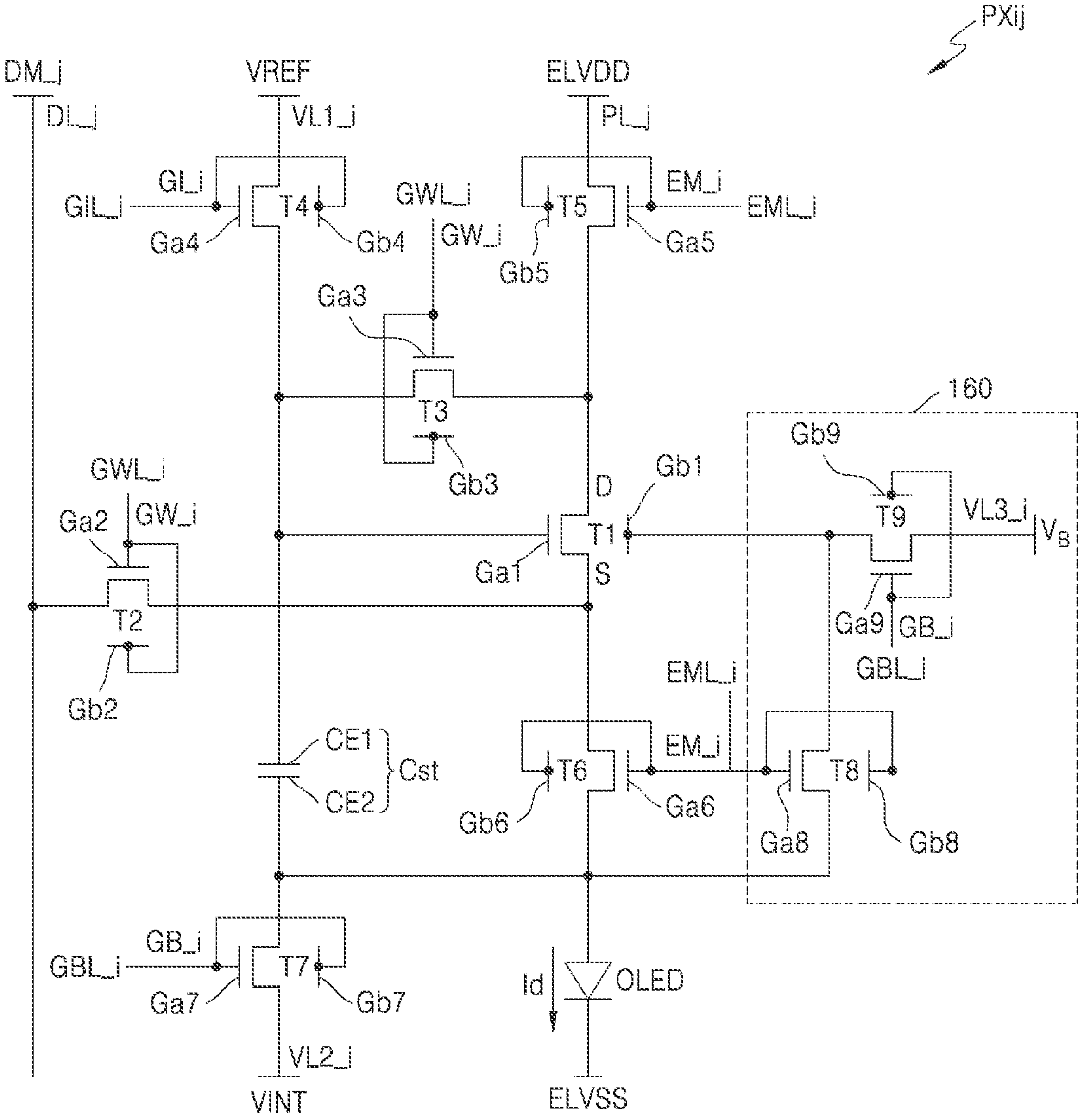
FIG. 7 is an equivalent circuit diagram of a pixel according to an embodiment.

FIG. 7 is an equivalent circuit diagram of a pixel according to an embodiment. FIG. 7 includes features described with reference to FIG. 2 and is different from FIG. 2 in the structure of the gate of each of switching transistors T2 to T9.

Referring to FIG. 7, the driving transistor T1 may include a first upper gate Ga1 and a first lower gate Gb1. The first upper gate Ga1 corresponds to the upper gate Ga of FIG. 2, and the first lower gate Gb1 corresponds to the lower gate Gb of FIG. 2.

Each of the switching transistors included in the pixel PXij may have an upper gate and a lower gate. The scan transistor T2 may have a second upper gate Ga2 and a second lower gate Gb2. The compensation transistor T3 may have a third upper gate Ga3 and a third lower gate Gb3. The gate initialization transistor T4 may have a fourth upper gate Ga4 and a fourth lower gate Gb4. The first emission control transistor T5 may have a fifth upper gate Ga5 and a fifth lower gate Gb5. The second emission control transistor T6 may have a sixth upper gate Ga6 and a sixth lower gate Gb6. The anode initialization transistor T7 may have a seventh upper gate Ga7 and a seventh lower gate Gb7. The first voltage control transistor T8 may have an eighth upper gate Ga8 and an eighth lower gate Gb8. The second voltage control transistor T9 may have a ninth upper gate Ga9 and a ninth lower gate Gb9.

The upper gate may be connected to the lower gate in each of the switching transistors. The second upper gate Ga2 may be connected to the second lower gate Gb2. The third upper gate Ga3 may be connected to the third lower gate Gb3. The fourth upper gate Ga4 may be connected to the fourth lower gate Gb4. The fifth upper gate Ga5 may be connected to the fifth lower gate Gb5. The sixth upper gate Ga6 may be connected to the sixth lower gate Gb6. The seventh upper gate Ga7 may be connected to the seventh lower gate Gb7. The eighth upper gate Ga8 may be connected to the eighth lower gate Gb8. The ninth upper gate Ga9 may be connected to the ninth lower gate Gb9. Because the upper gate is connected to the lower gate in each switching transistor, electron mobility inside the transistor may be improved.

Each of FIG. 8, FIG. 9A, FIG. 9B, FIG. 9C, and FIG. 9D is a cross-sectional view of a structure of a display element according to an embodiment.

Figure 8:
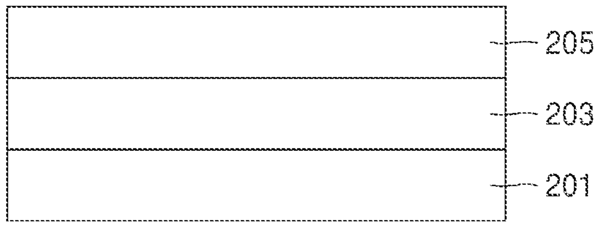
FIG. 8 is a cross-sectional view of a structure of a display element according to an embodiment.

Referring to FIG. 8, an organic light-emitting diode OLED as the display element may include a pixel electrode 201, an opposite electrode 205, and an intermediate layer 203 between the pixel electrode 201 (a first electrode, an anode) and the opposite electrode 205 (a second electrode, a cathode).

The pixel electrode 201 may include a conductive oxide, which is light-transmissive, such as indium tin oxide (ITO), indium zinc oxide (IZO), zinc oxide (ZnO), indium oxide ($In_2O_3$), indium gallium oxide (IGO), or aluminum zinc oxide (AZO). The pixel electrode 201 may include a reflective layer including silver (Ag), magnesium (Mg), aluminum (Al), platinum (Pt), palladium (Pd), gold (Au), nickel (Ni), neodymium (Nd), iridium (Ir), chrome (Cr), or a compound thereof. The pixel electrode 201 may have a three-layered structure of ITO-Ag-ITO.

The opposite electrode 205 may be disposed on the intermediate layer 203. The opposite electrode 205 may include a metal having a low work function and/or an alloy. The opposite electrode 205 may include lithium (Li), silver (Ag), magnesium (Mg), aluminum (Al), aluminum-lithium (Al—Li), calcium (Ca), magnesium-indium (Mg—In), magnesium-silver (Mg—Ag), ytterbium (Yb), silver-ytterbium (Ag—Yb), ITO, IZO, or a combination of some of the above materials. The opposite electrode 205 may be a transmissive electrode, a semi-transmissive electrode, or a reflective electrode.

The intermediate layer 203 may include a polymer organic material or a low-molecular weight organic material emitting light having a preset color. The intermediate layer 203 may further include a metal-containing compound (such as an organic metal compound) and/or an inorganic material (such as quantum dots).

The intermediate layer 203 may include an emission layer and a first functional layer and a second functional layer respectively positioned directly on two opposite faces of the emission layer. The first functional layer may include a hole transport layer (HTL), or may include an HTL and a hole injection layer (HIL). The second functional layer may be disposed on the emission layer and may be optional. The second functional layer may include an electron transport layer (ETL) and/or an electron injection layer (EIL).

The intermediate layer 203 may include two or more emitting units and a charge generation layer CGL, wherein the two or more emitting units overlap each other between the pixel electrode 201 and the opposite electrode 205, and the charge generation layer CGL is disposed between the two emitting units. When the intermediate layer 203 includes the emitting unit and the charge generation layer, the organic light-emitting diode OLED may be a tandem light-emitting element. The organic light-emitting diode OLED may improve color purity and light emission efficiency by having a stack structure of a plurality of emitting units.

One emitting unit may include an emission layer, a first functional layer, and a second functional layer. The two functional layers may be respectively positioned directly on two opposite faces of the emission layer. The charge generation layer CGL may include a negative charge generation layer and a positive charge generation layer. The organic light-emitting diode OLED, which is a tandem light-emitting element having a plurality of emission layers, may increase light emission efficiency even more due to the negative charge generation layer and the positive charge generation layer.

The negative charge generation layer may be an n-type charge generation layer. The negative charge generation layer may supply electrons. The negative charge generation layer may include a host and dopants. The host may include an organic material. The dopants may include metal materials. The positive charge generation layer may be a p-type charge generation layer. The positive charge generation layer may supply holes. The positive charge generation layer may include a host and dopants. The host may include an organic material. The dopants may include metal materials.

Figure 9A:
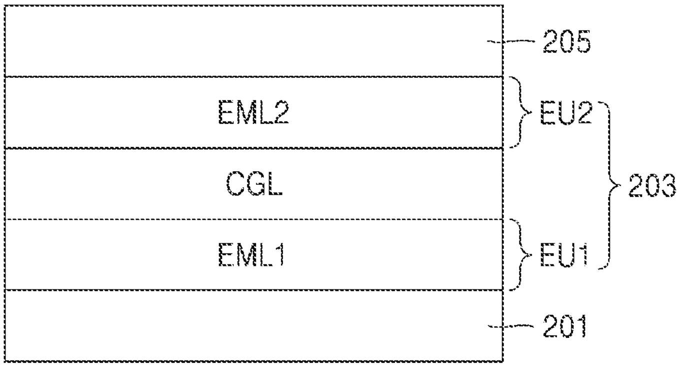
FIG. 9A is a cross-sectional view of a structure of a display element according to an embodiment.

Referring to FIG. 9A, the organic light-emitting diode OLED may include a first emitting unit EU1 and a second emitting unit EU2 that overlap each other, wherein the first emitting unit EU1 includes a first emission layer EML1, and wherein the second emitting unit EU2 includes a second emission layer EML2. The charge generation layer CGL may be disposed between the first emitting unit EU1 and the second emitting unit EU2. The organic light-emitting diode OLED may include a pixel electrode 201, the first emission layer EML1, the charge generation layer CGL, the second emission layer EML2, and an opposite electrode 205 that are sequentially stacked. A first functional layer and a second functional layer may be respectively positioned directly on two opposite faces of the first emission layer EML1. A first functional layer and a second functional layer may be respectively positioned directly on two opposite faces of the second emission layer EML2. The first emission layer EML1 may be a blue emission layer, and the second emission layer EML2 may be a yellow emission layer.

Figure 9B:
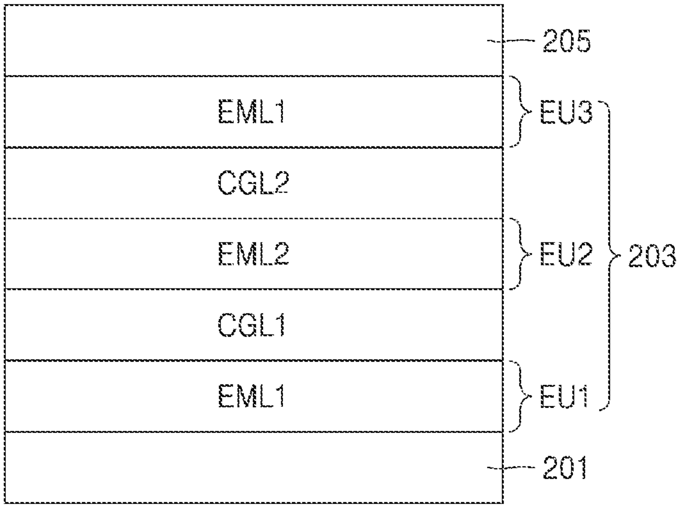
FIG. 9B is a cross-sectional view of a structure of a display element according to an embodiment.

Referring to FIG. 9B, the organic light-emitting diode OLED may include a first emitting unit EU1, a third emitting unit EU3, and a second emitting unit EU2, wherein the first emitting unit EU1 and the third emitting unit EU3 each include a first emission layer EML1, and the second emitting unit EU2 includes a second emission layer EML2. A first charge generation layer CGL1 may be disposed between the first emitting unit EU1 and the second emitting unit EU2, and a second charge generation layer CGL2 may be disposed between the second emitting unit EU2 and the third emitting unit EU3. The organic light-emitting diode OLED may include a pixel electrode 201, the first emission layer EML1, the first charge generation layer CGL1, the second emission layer EML2, the second charge generation layer CGL2, the first emission layer EML1, and an opposite electrode 205 that are sequentially stacked. A first functional layer and a second functional layer may be respectively positioned directly on two opposite faces of the first emission layer EML1. A first functional layer and a second functional layer may be respectively positioned directly on two opposite faces of the second emission layer EML2. The first emission layer EML1 may be a blue emission layer, and the second emission layer EML2 may be a yellow emission layer.

Figure 9C:
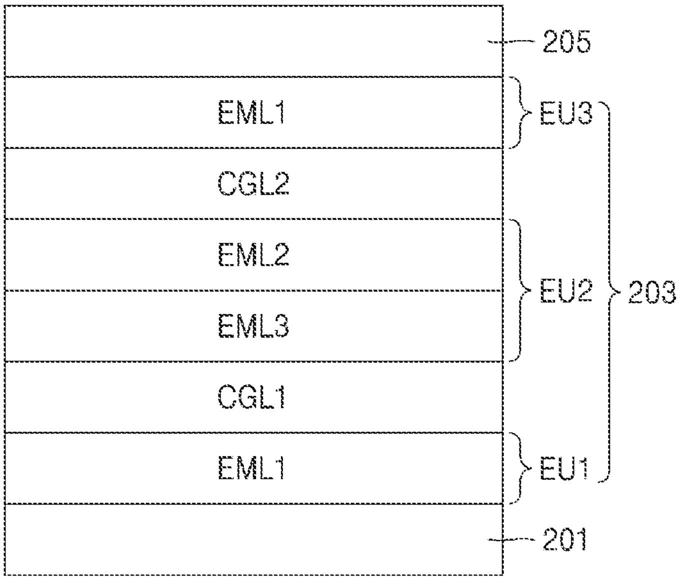
FIG. 9C is a cross-sectional view of a structure of a display element according to an embodiment.
Figure 9D:
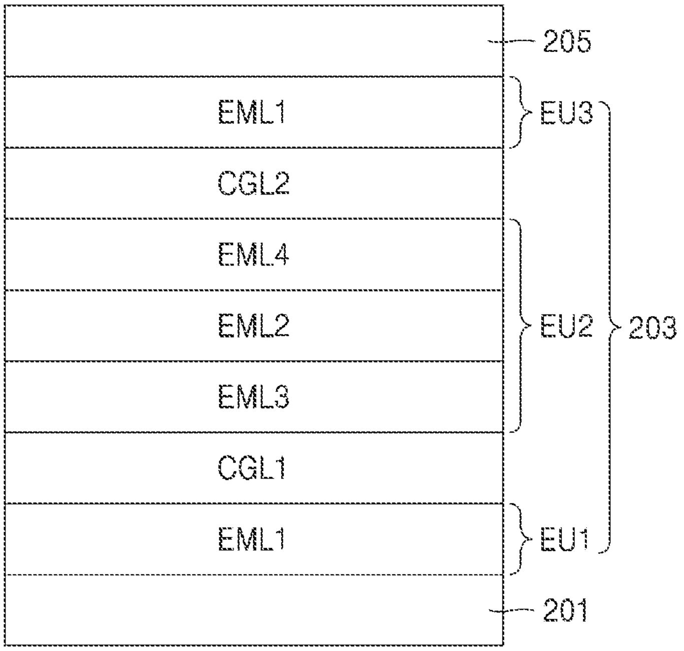
FIG. 9D is a cross-sectional view of a structure of a display element according to an embodiment.

Referring to FIG. 9C and FIG. 9D, a second emitting unit EU2 of the organic light-emitting diode OLED may further include a third emission layer EML3 and/or a fourth emission layer EML4 directly contacting (two opposite faces of)

the second emission layer EML2. No intervening layer may be disposed between the second emission layer EML2 and the third emission layer EML3, and/or no intervening layer may be disposed between the second emission layer EM2 and the fourth emission layer EML4. The third emission layer EML3 may be a red emission layer, and the fourth emission layer EML4 may be a green emission layer.

Referring to FIG. 9C, the organic light-emitting diode OLED may include a pixel electrode 201, a first emission layer EML1, a first charge generation layer CGL1, a third emission layer EML3, a second emission layer EML2, a second charge generation layer CGL2, a first emission layer EML1, and an opposite electrode 205. Referring to FIG. 9D, the organic light-emitting diode OLED may include a pixel electrode 201, a first emission layer EML1, a first charge generation layer CGL1, a third emission layer EML3, a second emission layer EML2, a fourth emission layer EML4, a second charge generation layer CGL2, a first emission layer EML1, and an opposite electrode 205.

Figure 10A:
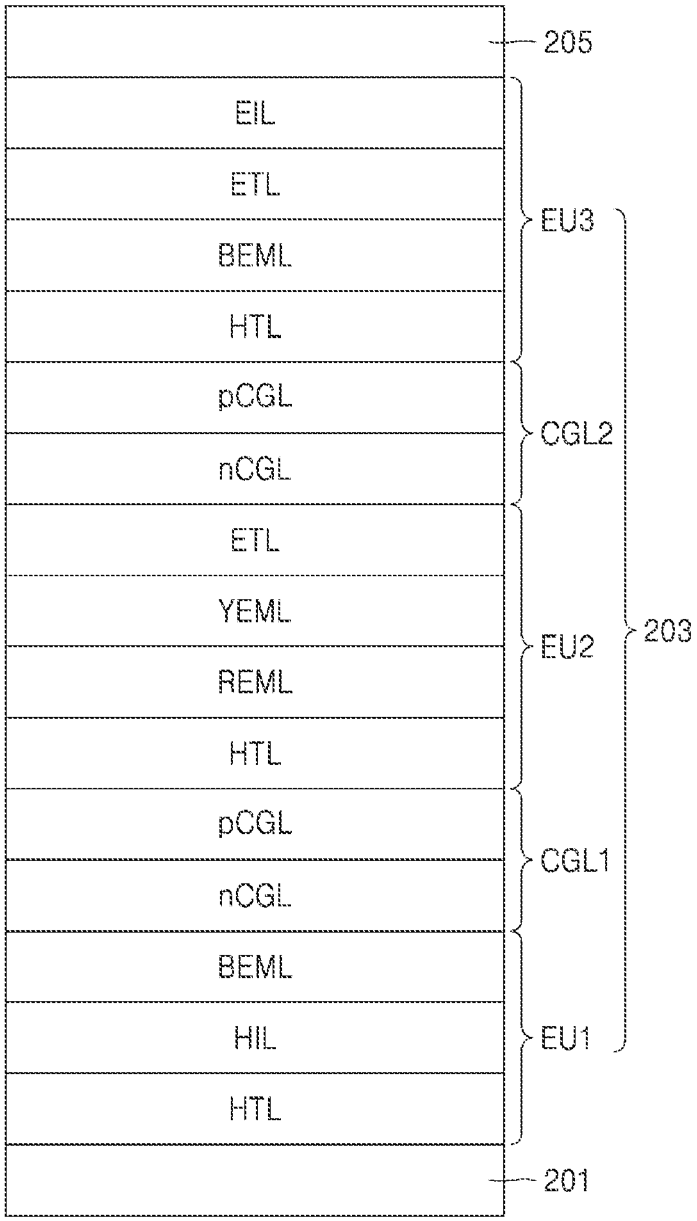
FIG. 10A is a cross-sectional view of an organic light-emitting diode of FIG. 9C according to an embodiment.
Figure 10B:
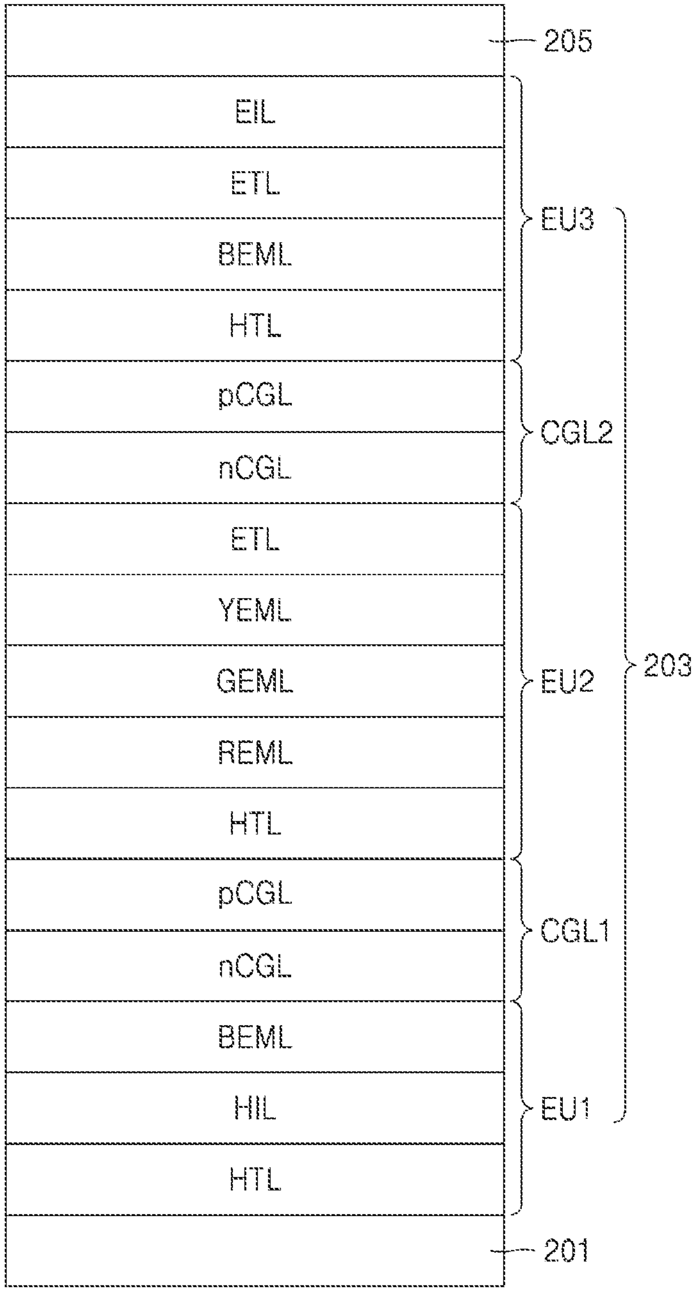
FIG. 10B is a cross-sectional view of an organic light-emitting diode of FIG. 9D according to an embodiment.

FIG. 10A is a cross-sectional view of the organic light-emitting diode of FIG. 9C according to an embodiment. FIG. 10B is a cross-sectional view of the organic light-emitting diode of FIG. 9D according to an embodiment.

Referring to FIG. 10A, the organic light-emitting diode OLED may include the first emitting unit EU1, the second emitting unit EU2, and the third emitting unit EU3 that overlap each other. A first charge generation layer CGL1 may be disposed between the first emitting unit EU1 and the second emitting unit EU2, and a second charge generation layer CGL2 may be disposed between the second emitting unit EU2 and the third emitting unit EU3. Each of the first charge generation layer CGL1 and the second charge generation layer CGL2 may include a negative charge generation layer nCGL and a positive charge generation layer pCGL.

The first emitting unit EU1 may include a blue emission layer BEML. The first emitting unit EU1 may further include a hole injection layer HIL and a hole transport layer HTL between the pixel electrode 201 and the blue emission layer BEML. The first emitting unit EU1 may further include a p-doped layer between the hole injection layer HIL and the hole transport layer HTL. The p-doped layer may be formed by doping the hole injection layer HIL with p-type dopants. At least one of a blue light auxiliary layer, an electron blocking layer, and a buffer layer may be disposed between the blue emission layer BEML and the hole transport layer HTL. The blue light auxiliary layer may increase light output efficiency of the blue emission layer BEML. The blue light auxiliary layer may increase light output efficiency of the blue emission layer BEML by adjusting the hole charge balance. The electron blocking layer may prevent electron injection to the hole transport layer HTL. The buffer layer may compensate for a resonance distance corresponding to the wavelength of light emitted from the emission layer.

The second emitting unit EU2 may include a yellow emission layer YEML and a red emission layer REML under the yellow emission layer YEML, wherein the red emission layer REML directly contacts the yellow emission layer YEML. The second emitting unit EU2 may further include a hole transport layer HTL and an electron transport layer ETL, wherein the hole transport layer HTL is between the positive charge generation layer pCGL of the first charge generation layer CGL1 and the red emission layer REML, and wherein the electron transport layer ETL is between the yellow emission layer YEML and the negative charge generation layer nCGL of the second charge generation layer CGL2.

The third emitting unit EU3 may include a blue emission layer BEML. The third emitting unit EU3 may further include a hole transport layer HTL between the positive charge generation layer pCGL of the second charge generation layer CGL2 and the blue emission layer BEML. The third emitting unit EU3 may further include an electron transport layer ETL and an electron injection layer EIL between the blue emission layer BEML and the opposite electrode 205. The electron transport layer ETL may include a single layer or a multi-layer structure. At least one of a blue light auxiliary layer, an electron blocking layer, and a buffer layer may be disposed between the blue emission layer BEML and the hole transport layer HTL. At least one of a hole blocking layer and a buffer layer may be disposed between the blue emission layer BEML and the electron transport layer ETL. The hole blocking layer may prevent hole injection to the electron transport layer ETL.

The stack structure of the second emitting unit EU2 of the organic light-emitting diode OLED shown in FIG. 10B is different from that of the organic light-emitting diode OLED shown in FIG. 10A. Referring to FIG. 10B, the second emitting unit EU2 may include a yellow emission layer YEML, a red emission layer REML, and a green emission layer GEML, wherein the red emission layer REML is under the green emission layer GEML and directly contacts the green emission layer GEML, and wherein the yellow emission layer YEML is on the green emission layer GEML and directly contacts the green emission layer GEML. The second emitting unit EU2 may further include a hole transport layer HTL and an electron transport layer ETL, wherein the hole transport layer HTL is between the positive charge generation layer pCGL of the first charge generation layer CGL1 and the red emission layer REML, and wherein the electron transport layer ETL is between the yellow emission layer YEML and the negative charge generation layer nCGL of the second charge generation layer CGL2.

Figure 11:
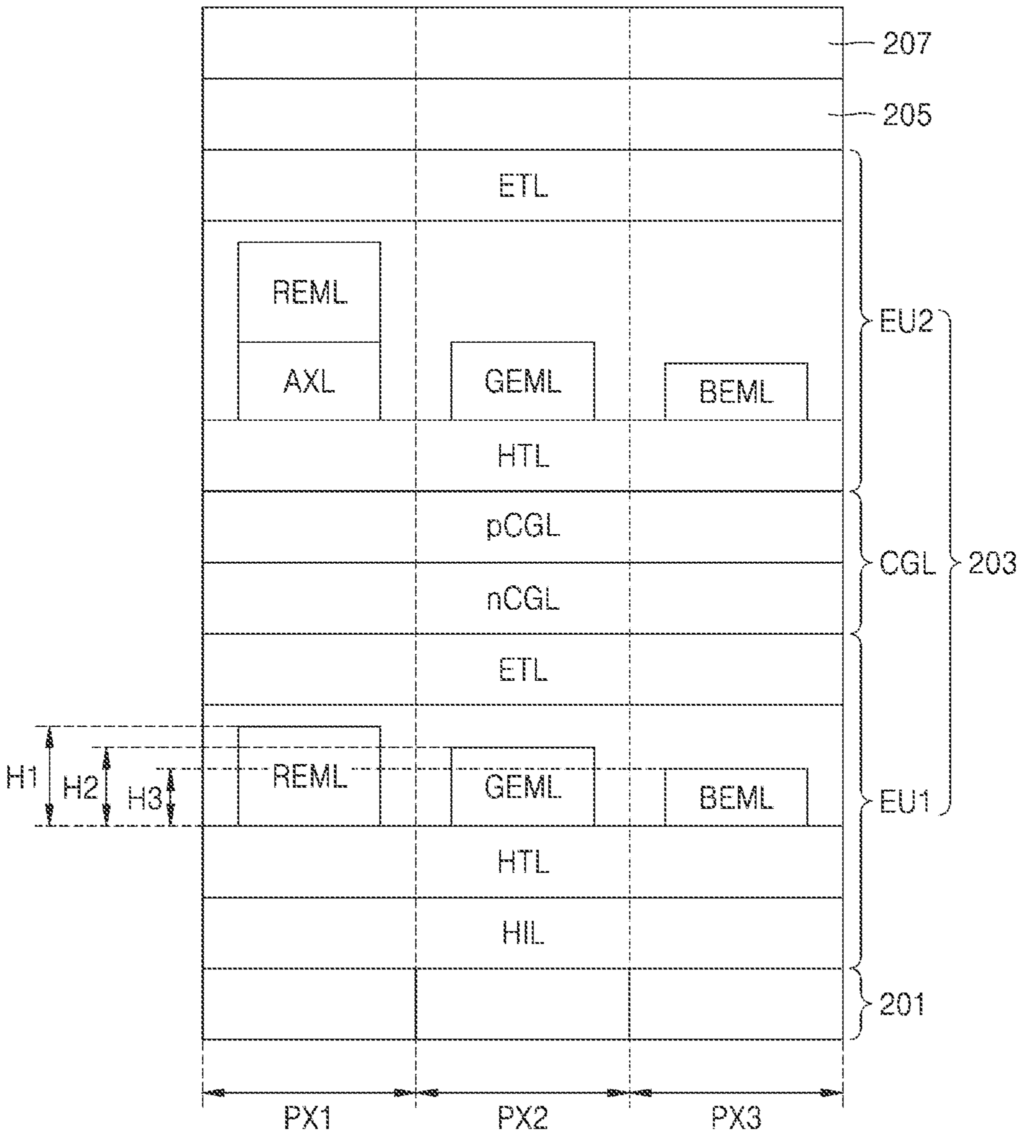
FIG. 11 is a cross-sectional view of a structure of a pixel of a display apparatus according to an embodiment.

FIG. 11 is a cross-sectional view of a structure of a pixel of a display apparatus according to an embodiment.

Referring to FIG. 11, the display apparatus may include a plurality of pixels. The plurality of pixels may include a first pixel PX1, a second pixel PX2, and a third pixel PX3. Each of the first pixel PX1, the second pixel PX2, and the third pixel PX3 may include a pixel electrode 201, a portion of the opposite electrode 205, and an intermediate layer 203. The first pixel PX1 may be a red pixel, the second pixel PX2 may be a green pixel, and the third pixel PX3 may be a blue pixel. Each of the pixels may include an organic light-emitting diode OLED electrically connected to a pixel circuit.

The intermediate layer 203 of the organic light-emitting diode OLED of each of the first pixel PX1, the second pixel PX2, and the third pixel PX3 may include a first emitting unit EU1, a second emitting unit EU2, and a portion of a charge generation layer CGL between the first emitting unit EU1 and the second emitting unit EU2. The charge generation layer CGL may include a negative charge generation layer nCGL and a positive charge generation layer pCGL. The charge generation layer CGL may be a common layer shared by the first pixel PX1, the second pixel PX2, and the third pixel PX3.

The first emitting unit EU1 of the first pixel PX1 may include a portion of a hole injection layer HIL, a portion of a hole transport layer HTL, a red emission layer REML, and a portion of an electron transport layer ETL that are sequentially stacked on the pixel electrode 201. The first emitting unit EU1 of the second pixel PX2 may include a portion of the hole injection layer HIL, a portion of the hole transport layer HTL, a green emission layer GEML, and a portion of the electron transport layer ETL that are sequentially stacked on the pixel electrode 201. The first emitting unit EU1 of the third pixel PX3 may include a portion of the hole injection layer HIL, a portion of the hole transport layer HTL, a blue emission layer BEML, and a portion of the electron transport layer ETL that are sequentially stacked on the pixel electrode 201. Each of the hole injection layer HIL, the hole transport layer HTL, and the electron transport layer ETL of the first emitting units EU1 may be a common layer shared by the first pixel PX1, the second pixel PX2, and the third pixel PX3.

The second emitting unit EU2 of the first pixel PX1 may include a portion of a hole transport layer HTL, an auxiliary layer AXL, a red emission layer REML, and a portion of an electron transport layer ETL that are sequentially stacked on the charge generation layer CGL. The second emitting unit EU2 of the second pixel PX2 may include a portion of the hole transport layer HTL, a green emission layer GEML, and a portion of the electron transport layer ETL that are sequentially stacked on the charge generation layer CGL. The second emitting unit EU2 of the third pixel PX3 may include a portion of the hole transport layer HTL, a blue emission layer BEML, and a portion of the electron transport layer ETL that are sequentially stacked on the charge generation layer CGL. Each of the hole transport layer HTL, and the electron transport layer ETL of the second emitting units EU2 may be a common layer shared by the first pixel PX1, the second pixel PX2, and the third pixel PX3. At least one of a hole blocking layer and a buffer layer may be provided between the emission layer and the electron transport layer ETL of the second emitting unit EU2 of the first pixel PX1, the second pixel PX2, and the third pixel PX3.

A thickness H1 of the red emission layer REML, a thickness H2 of the green emission layer GEML, and a thickness H3 of the blue emission layer BEML may be determined according to a resonance distance. The auxiliary layer AXL may adjust the resonance distance, and may include a resonance auxiliary material. The auxiliary layer AXL may include the same material as that of the hole transport layer HTL.

FIG. 11 that the auxiliary layer AXL is provided to only the first pixel PX1. The auxiliary layer AXL may be provided to at least one of the first pixel PX1, the second pixel PX2, and the third pixel PX3 to adjust the resonance distance of one or more of the first pixel PX1, the second pixel PX2, and the third pixel PX3.

The display apparatus may further include a capping layer 207 disposed on the outer side of the opposite electrode 205. The capping layer 207 may improve light emission efficiency using a constructive interference principle. Accordingly, because the light extraction efficiency of the organic light-emitting diodes OLED increase, the light emission efficiency of the organic light-emitting diode OLED may be improved.

Embodiments may be related to a pixel and/or a display apparatus. Embodiments may be related to a method of manufacturing the pixel and/or a method of manufacturing the display apparatus.

According to an embodiment, in a pixel of a display apparatus, a threshold voltage of the driving transistor may be adjusted. Advantageously, the quality of images displayed by the display apparatus may be satisfactory.

The described embodiments should be considered in an illustrative sense and not for purposes of limitation. Descriptions of features or aspects within each embodiment should typically be considered as available for other similar features or aspects in other embodiments. While embodiments have been described with reference to the figures, various changes in form and details may be made in the described embodiments without departing from the scope defined by the following claims.

What is claimed is:

1. A pixel comprising:

a display element configured to emit light for an emission period, and including an anode and a cathode;

a driving transistor configured to control an amount of a driving current flowing through the display element, wherein the driving transistor includes a first gate and a second gate;

a storage capacitor electrically connected to the first gate of the driving transistor;

a scan transistor configured to be turned on for a data-write period and to transfer a data voltage to the driving transistor; and a gate control circuit configured to electrically connect the second gate of the driving transistor to the anode of the display element for the emission period, and configured to apply a bias voltage to the second gate of the driving transistor for the data-write period, wherein a voltage between the second gate and a source of the driving transistor is at a first level for the data-write period, and is at a second level for the emission period, wherein the second level is higher than the first level.

2. The pixel of claim 1, wherein the bias voltage is determined based on a minimum voltage within a data voltage range and a threshold voltage of the driving transistor.

3. The pixel of claim 1, wherein the gate control circuit includes:

a first voltage control transistor configured to be turned on for the emission period to electrically connect the second gate of the driving transistor to the anode of the display element; and a second voltage control transistor configured to be turned on for the data-write period to transfer the bias voltage to the second gate of the driving transistor.

4. The pixel of claim 3, further comprising:

a first emission control transistor configured to be turned on for the emission period to transfer a driving voltage to a drain of the driving transistor; and a second emission control transistor configured to be turned on for the emission period to electrically connect a source of the driving transistor to the anode of the display element.

5. The pixel of claim 4, wherein a gate of the first voltage control transistor is electrically connected to both a gate of the first emission control transistor and a gate of the second emission control transistor.

6. The pixel of claim 4, further comprising:

a compensation transistor configured to be turned on for the data-write period to connect the first gate of the driving transistor to the drain of the driving transistor;

a first initialization transistor configured to be turned on for a first initialization period to transfer a reference voltage to the first gate of the driving transistor; and a second initialization transistor configured to be turned on for a second initialization period to transfer an initialization voltage to the anode of the display element, wherein the scan transistor is configured to transfer the data voltage to the source of the driving transistor.

7. The pixel of claim 6, wherein a gate of the second voltage control transistor is electrically connected to a gate of the second initialization transistor.

8. The pixel of claim 6, wherein the second initialization period includes the first initialization period and the data-write period.

9. The pixel of claim 1, wherein the driving transistor is an n-type metal oxide semiconductor field-effect transistor.

10. The pixel of claim 1, wherein the driving transistor includes a semiconductor layer positioned between the second gate and the first gate.

11. The pixel of claim 10, wherein the semiconductor layer includes an oxide semiconductor material.

12. A display apparatus comprising:

a substrate extending in a first direction and a second direction; and pixels arranged on the substrate in the first direction and the second direction, wherein the pixels include the pixel of claim 1.

13. A pixel electrically connected to each of a first scan line, a second scan line, a third scan line, an emission control line, a data line, a power line, a first voltage line, a second voltage line, and a third voltage line, the first scan line being configured to transfer a first scan signal, the second scan line being configured to transfer a second scan signal, the third scan line being configured to transfer a third scan signal, the emission control line being configured to transfer an emission control signal, the data line being configured to transfer a data voltage, the power line being configured to transfer a driving voltage, the first voltage line being configured to transfer a reference voltage, the second voltage line being configured to transfer an initialization voltage, the third voltage line being configured to transfer a bias voltage, the pixel comprising:

a display element including an anode and a cathode;

a storage capacitor including a first electrode and a second electrode, the second electrode being electrically connected to the anode of the display element;

a first transistor including a first gate, a second gate, a drain, and a source, wherein the first gate is electrically connected to the first electrode of the storage capacitor;

a second transistor configured to connect the data line to the source of the first transistor in response to the first scan signal;

a third transistor configured to connect the first gate of the first transistor to the drain of the first transistor in response to the first scan signal;

a fourth transistor configured to connect the first voltage line to the first gate of the first transistor in response to the second scan signal;

a fifth transistor configured to connect the power line to the drain of the first transistor in response to the emission control signal;

a sixth transistor configured to connect the anode of the display element to the source of the first transistor in response to the emission control signal;

a seventh transistor configured to connect the second voltage line to the anode of the display element in response to the third scan signal;

an eighth transistor configured to connect the second gate of the first transistor to the anode of the display element in response to the emission control signal; and a ninth transistor configured to connect the third voltage line to the second gate of the first transistor in response to the third scan signal.

14. The pixel of claim 13, wherein the bias voltage is determined based on a minimum voltage within a data voltage range and a threshold voltage of the first transistor.

15. The pixel of claim 13, wherein the first transistor includes a semiconductor layer located between the second gate and the first gate and including an oxide semiconductor material.

16. The pixel of claim 13, wherein a voltage between the second gate of the first transistor and the source of the first transistor is at a first level for a data-write period for which both the second transistor and the third transistor are turned on by the first scan signal, and is at a second level for an emission period for which all of the fifth transistor, the sixth transistor, and the eighth transistor are turned on by the emission control signal.

17. The display apparatus of claim 16, wherein the first level is lower than the second level.

18. The pixel of claim 13, wherein the first transistor, the second transistor, the third transistor, the fourth transistor, the fifth transistor, the sixth transistor, the seventh transistor, the eighth transistor, and the ninth transistor are n-type metal oxide semiconductor field-effect transistors.

19. The pixel of claim 13, wherein each of the second transistor, the third transistor, the fourth transistor, the fifth transistor, the sixth transistor, the seventh transistor, the eighth transistor, and the ninth transistor includes a first gate electrode and a second gate electrode electrically connected to each other.

* * * * *